(12) United States Patent
Derr et al.

(10) Patent No.: US 10,678,623 B2
(45) Date of Patent: Jun. 9, 2020

(54) ERROR REPORTING AND HANDLING USING A COMMON ERROR HANDLER

(71) Applicant: Intel Corporation, Santa Clara, CA (US)

(72) Inventors: Michael N. Derr, El Dorado Hills, CA (US); Balaji Vembu, Folsom, CA (US); Michael Mishaeli, Zichron Yaakov (IL); Brent Chartrand, Folsom, CA (US); Bryan R White, Chandler, AZ (US); Gustavo Espinosa, Portland, OR (US); Prashant D. Chaudhari, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 190 days.

(21) Appl. No.: 15/818,429

(22) Filed: Nov. 20, 2017

(65) Prior Publication Data
US 2019/0050279 A1    Feb. 14, 2019

(51) Int. Cl.
G06F 11/07    (2006.01)
H04L 12/24    (2006.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 11/0772* (2013.01); G06F 11/0736 (2013.01); G06F 11/0781 (2013.01); H04L 41/06 (2013.01); H04L 41/0631 (2013.01)

(58) Field of Classification Search
CPC ............. G06F 11/2268; G06F 11/3476; G06F 11/0769; G06F 11/0781; G06F 11/0772; G01R 31/31705; H04Q 3/0087; H04L 41/06; H04L 41/0604; H04L 41/0631
See application file for complete search history.

(56) References Cited

U.S. PATENT DOCUMENTS

| 6,795,935 B1* | 9/2004 | Unkle ................ G05B 23/0275 340/438 |
| 2007/0005852 A1* | 1/2007 | Armstead ........... G06F 11/3476 710/100 |
| 2008/0117068 A1* | 5/2008 | Sandstrom .............. H04L 41/06 340/635 |
| 2008/0141077 A1* | 6/2008 | Swanson ............... G06F 11/008 714/48 |

(Continued)

*Primary Examiner* — Joseph O Schell
(74) *Attorney, Agent, or Firm* — Schwegman Lundberg & Woessner, P.A.

(57) ABSTRACT

Various systems and methods for error handling are described herein. A system for error reporting and handling includes a common error handler that handles errors for a plurality of hardware devices, where the common error handler is operable with other parallel error reporting and handling mechanisms. The common error handler may be used to receive an error message from a hardware device, the error message related to an error; identify a source of the error message; identify a class of the error; identify an error definition of the error; determine whether the error requires a diagnostics operation as part of the error handling; initiate the diagnostics operation when the error requires the diagnostics operation; and clear the error at the hardware device.

22 Claims, 6 Drawing Sheets

(56) References Cited

U.S. PATENT DOCUMENTS

| | | | | |
|---|---|---|---|---|
| 2008/0228337 A1* | 9/2008 | Bauerle | ............ | F02D 11/107 |
| | | | | 701/31.6 |
| 2011/0170667 A1* | 7/2011 | Ruggiero | ............ | A61B 6/461 |
| | | | | 378/98.5 |
| 2014/0013145 A1* | 1/2014 | Hopkins | ............ | G06F 1/3206 |
| | | | | 713/330 |
| 2014/0122931 A1* | 5/2014 | Devale | ............ | G06F 11/34 |
| | | | | 714/37 |
| 2019/0079820 A1* | 3/2019 | Anchuri | ............ | G06F 11/079 |

* cited by examiner

ERROR REPORTING AND HANDLING USING A COMMON ERROR HANDLER

TECHNICAL FIELD

Embodiments described herein generally relate to control systems, and in particular, to systems and methods for functional safety error reporting and handline.

BACKGROUND

Functional safety refers to ensuring that a system is able to operate correctly and perform appropriately in response to system failures or operator errors. Functional safety is highly important in systems where human lives are at risk. For instance, in systems such as autonomous vehicles, airplanes, or spacecraft, functional safety for mission critical systems is used to monitor and report errors so that corrective action may be performed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

As operational systems become more complex and sophisticated, it is an increasing challenge for functional safety and associated system software to monitor and react to errors across all of the system in an efficient manner. Take, for example, a small portion of an autonomous vehicle, such as a system on chip (SoC). In an SoC (or a platform, which may include multiple SoCs), multiple devices may exist, such as graphics devices, imaging pipe, memory controller, processors, and the like. Each device, or group of devices, may include interrupt registers to report operating status or error states. Prior systems reported these operating statuses or error states up through their specific device kernel, driver, or handler. In this siloed approach, error collection and aggregation across multiple stacks is difficult and burdensome. What is needed is a functional safety system that operates efficiently and failsafe across multiple devices, functions, or intellectual property (IP) cores.

The systems and methods described herein refer to a common error and reporting infrastructure. The infrastructure may be used to detect errors across an entire SoC, across multiple SoCs that are part of a larger system (e.g., in a shared package or on a common platform), or at any level of granularity (e.g., across packages).

A common error handler (CEH) may interface with two or more hardware blocks to capture errors or other status messages from the hardware blocks and act on them as appropriate. The CEH may execute diagnostic routines that perform various functions, such as resetting a hardware block, reconfiguring a hardware block, or disabling a hardware block, for example. Logging and other reporting features may be used in certain cases to alert users, system administrators, or other hardware blocks of failure or malfunction.

Figure 1:
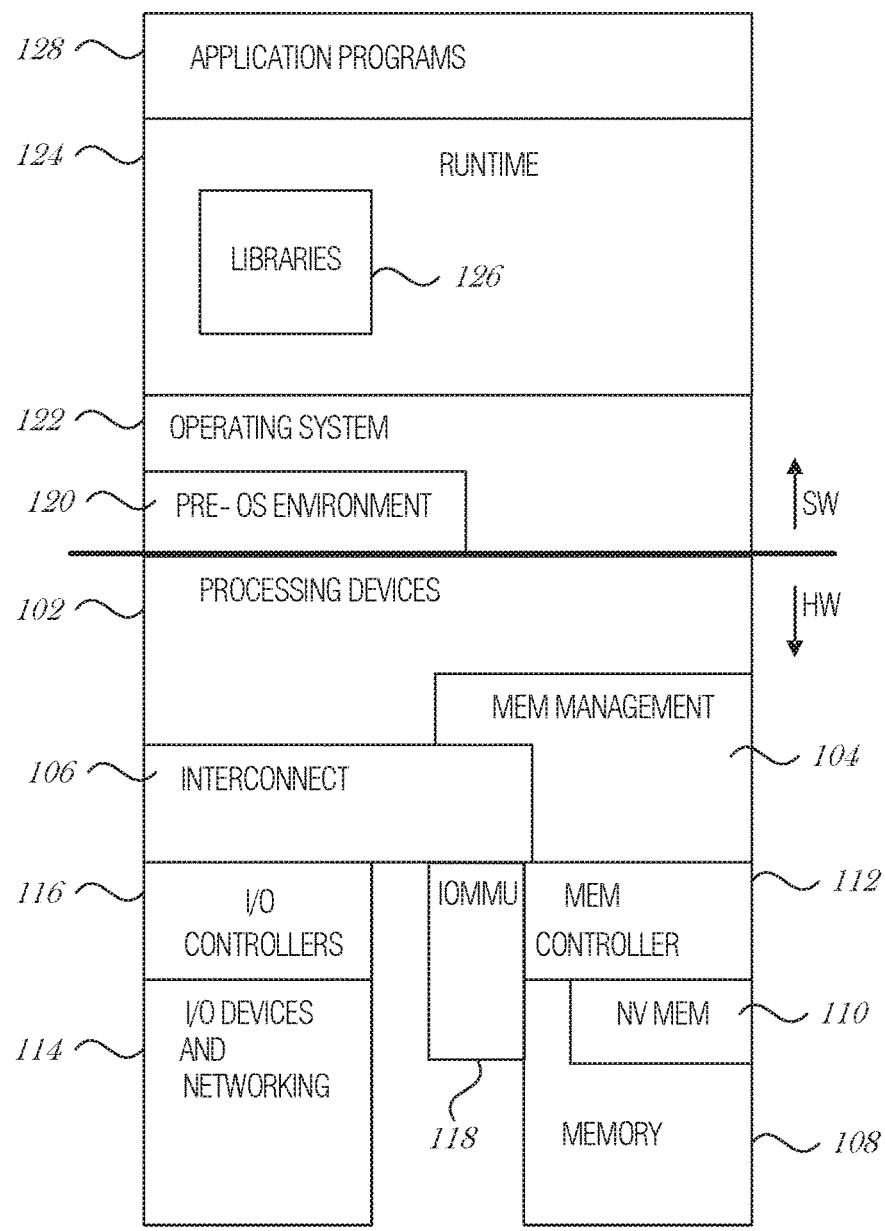
FIG. 1 is a diagram illustrating an exemplary hardware and software architecture microarchitecture of a computing device, in which various interfaces between hardware components and software components are shown, according to an embodiment.

FIG. 1 is a diagram illustrating an exemplary hardware and software architecture microarchitecture 100 of a computing device, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices, e.g., PCI, USB, etc. Memory 108 (e.g., dynamic random access memory—DRAM) and non-volatile memory 110 such as flash memory (e.g., electrically-erasable read-only memory—EEPROM, NAND Flash, NOR Flash, etc.) are interfaced with memory management device 104 and interconnect 106 via memory controller 112. This architecture microarchitecture 100 may support direct memory access (DMA) by peripherals in some embodiments, I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by meditating access to memory 108 from I/O device 114. IOMMU 118 may also provide DMA memory protection in virtualized environments, where it allows certain hardware resources to be assigned to certain guest VMs running on the system, and enforces isolation between other VMS and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basis operability of the computing device itself.

Figure 2:
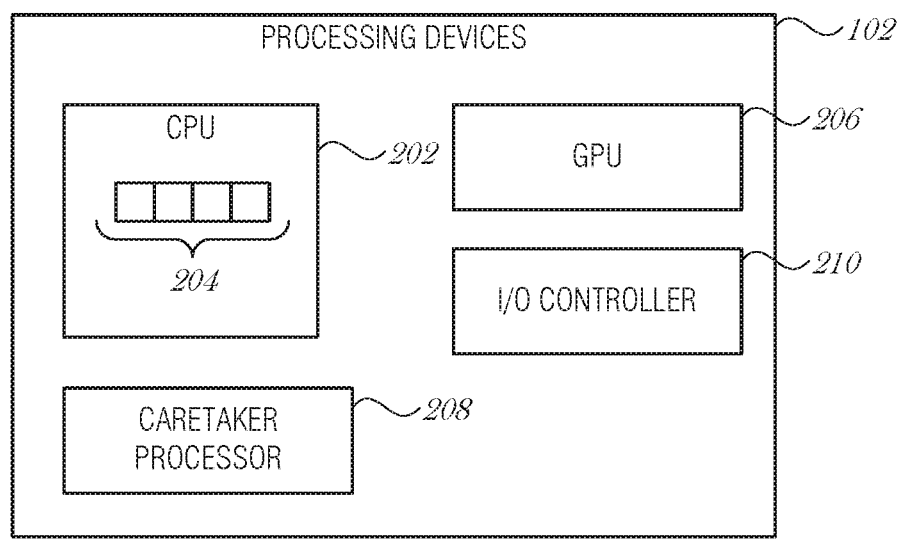
FIG. 2 is a block diagram illustrating processing devices, according to an embodiment.

FIG. 2 is a block diagram illustrating processing devices 102, according to an embodiment. In an embodiment, two or more of processing devices 102 depicted are formed on a common semiconductor substrate. CPU 202 may contain one or more processing cores 204, each of which has one or more arithmetic logic units (ALU), instruction fetch units, instruction decode units, control units, registers, data stack pointers, program counters, and other components according to the particular architecture of the CPU 202. As an illustrative example, CPU 202 may be an x86-type of processor. Processing devices 102 may also include a graphics processing unit (GPU) 206. In these embodiments, GPU 206 may be a specialized co-processor that performs certain computationally-intensive operations, particularly those associated with graphics rendering, for CPU 202. Notably, CPU 202 and GPU 206 generally work collaboratively, sharing access to memory resources, I/O channels, etc.

Processing devices 102 may also include caretaker processor 208 in some embodiments. Caretaker processor 208 generally does not participate in the processing work to carry out software code as CPU 202 and GPU 206 do. In some embodiments, caretaker processor 208 does not share memory space with CPU 202 and GPU 206, and is therefore not arranged to execute an operating system or application programs. Instead, caretaker processor 208 may execute dedicated firmware that supports the technical workings of CPU 202, GPU 206, and other components of the computer system. In some embodiments, caretaker processor 208 is implemented as a microcontroller or a processing device, which may be physically present on the same integrated circuit die as CPU 202, or may be present on a distinct integrated circuit die on the same or different package or platform. Caretaker processor 208 may also include a dedicated set of I/O facilities to enable it to communicate with external entities. In an embodiment, caretaker processor 208 is implemented using a manageability engine (ME) or platform security processor (PSP). In another embodiment, caretaker processor 208 may take the form of a power control unit (PCU) in some system architectures. In yet other embodiments, the caretaker processor 208 is implemented as common error handler (CEH) to support aspects of functional safety. A plurality of caretaker processors may exist in an embodiment.

Input/output (I/O) controller 210 coordinates information flow between the various processing devices 202, 206, 208, as well as with external circuitry, such as a system interconnect or main memory (e.g., DRAM).

Figure 3:
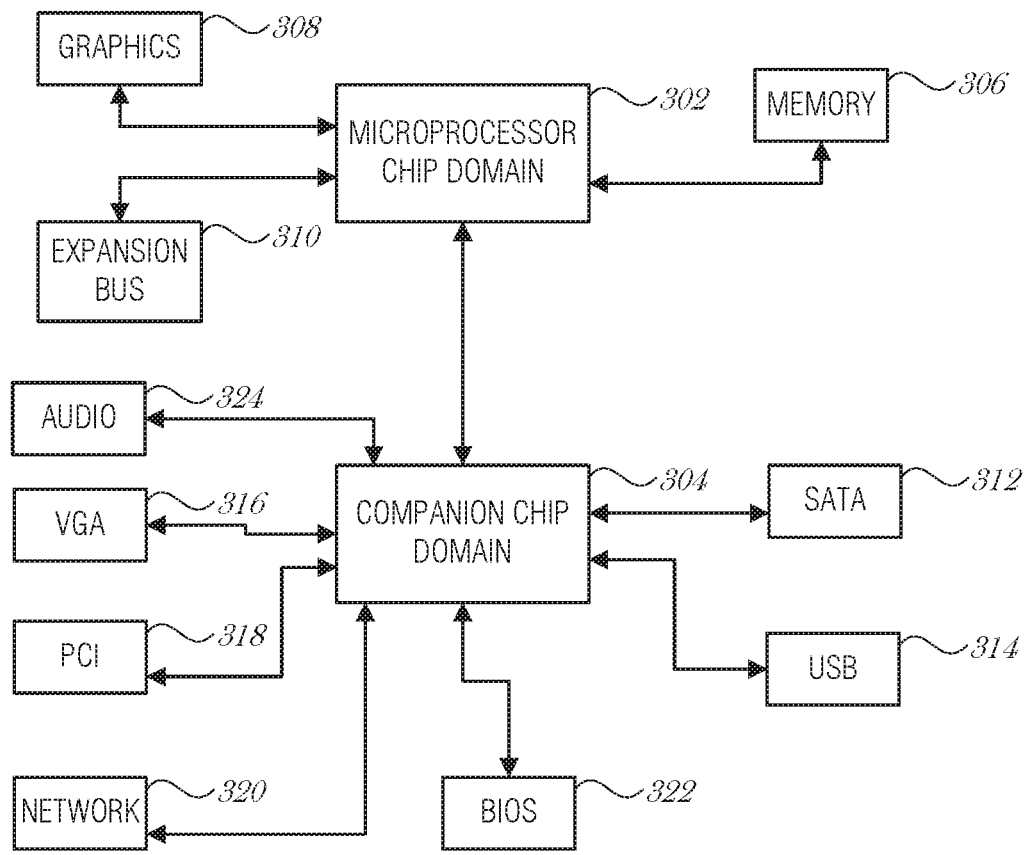
FIG. 3 is a block diagram illustrating a microarchitecture, according to an embodiment.

FIG. 3 is a block diagram illustrating a microarchitecture 300, according to an embodiment. The microarchitecture includes a microprocessor chip domain 302 and a companion chip domain 304 connected over a high-speed interface (e.g., Direct Media Interface).

The microprocessor chip domain 302 includes one or more processor cores, memory controller, display engine, and the like, while the companion chip domain 304 includes controllers and other circuitry to interface with peripheral devices. In the past, some processors were paired with two companion chips, often called the "north bridge" and "south bridge," or the memory controller hub (MCH) and input/output controller hub (ICH), respectively. In more modern processors, the functions of the north bridge are included in the processor itself and the south bridge has been replaced with a controller hub (e.g., platform controller hub (PCH)). As such, for this document, the term "microprocessor chip domain" includes modern processors that incorporate the north bridge, legacy processors that have a separate north bridge, and other configurations. The "companion chip domain" includes controllers and co-processors that provide additional input/output functions that support the microprocessor chip domain 302. The "companion chip domain" 304 may refer to a south bridge architecture in some embodiments.

The microprocessor chip domain 302 interfaces with memory 306, graphics ports 308, and high-speed expansion busses 310. Memory 306 may include various memory types including dual channel, double data-rate (DDR) DRAM, or the like. Graphics ports 308 may provide support for Display-Port (DP), Embedded Display Port (eDP), Digital Visual Interface (DVI), High-Definition Multimedia Interface (HDMI), Display Serial interface (DSI), Wireless Display (WiDi) or the like. High-speed expansion busses 310 include Peripheral Component Interconnect Express (PCIe), and the like.

The companion chip domain 304 provides support interfaces for peripheral devices, such as Serial ATA 312, Universal Serial Bus (USB) 314, Analog VGA 316, Audio 324, expansion card busses 318 (e.g., PCI, PCIe, etc.), network interfaces 320 (e.g., Ethernet or RF Wireless), and BIOS 322.

The microprocessor chip domain 302 and companion chip domain 304 may be integrated as separate chips or on a single chip with integrated controllers. Multiple-chip implementations provide higher performance and more expansion capability. Single-chip implementations may be optimized for small size and low cost. The actual architectural arrangement is dependent on the design of the target platform.

The processors, memory, accelerators, and other devices illustrated in FIGS. 1-3 may interact with each other to process workloads handled by the computing device. Various components of these devices illustrated in FIGS. 1-3 may be implemented as a system on chip (SoC). An SoC may include multiple hardware blocks, also referred to as intellectual property (IP) cores or IP blocks. The hardware blocks may communicate using a proprietary interconnect fabric. Examples of interconnect fabrics include Intel On-Chip System Fabric (IOSF) from Intel, Advance Microcontroller Bus Architecture (AMBA) from ARM, SoC-it from MIPS, and CoreConnect from IBM. These fabrics may provide a way to bridge to another compatible bus standard, such as by using Open Core Protocol (OCP) standard for IP cores (OCP-IP) socket technology.

Alternatively, the hardware blocks may communicate with each other using a network on chip (NoC) communication framework. An NoC framework provides a way for companies to integrate third-party IP cores with their own proprietary IP cores. An NoC framework may route all traffic throughout the chip across a shared bus. It is understood that other bus technologies or fabrics may be used to implement the features and functions described herein.

Figure 4:
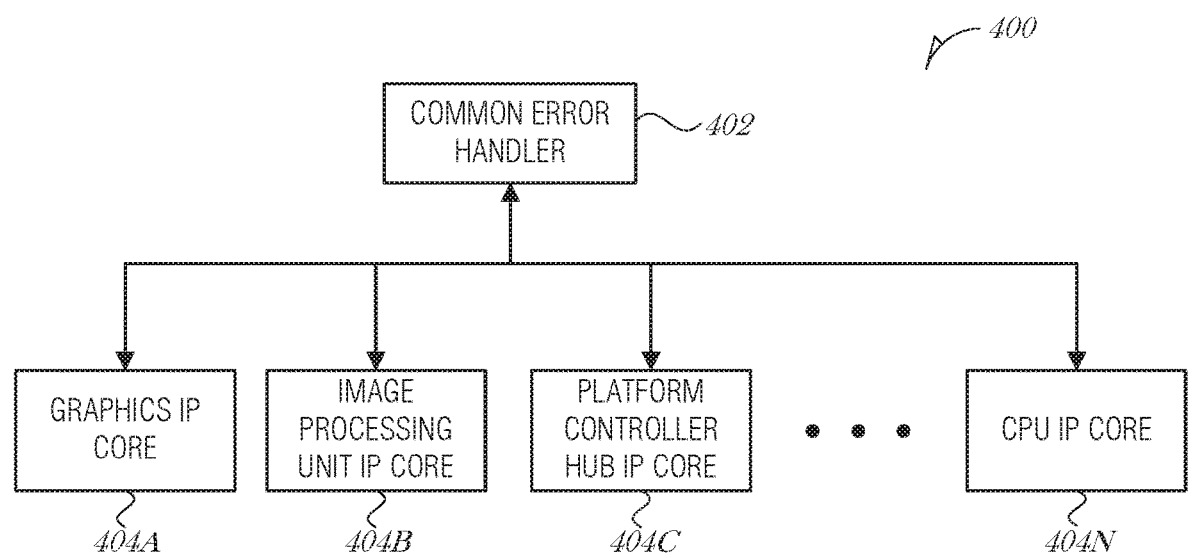
FIG. 4 is a diagram illustrating a common error handler (CEH) architecture, according to an embodiment.

FIG. 4 is a diagram illustrating a common error handler (CEH) architecture 400, according to an embodiment. The CEH architecture 400 includes a common error handler (CEH) 402 that is communicatively coupled to a number of IP cores 404, such as graphics IP core 404A, image processing unit IP core 404B, platform controller hub (PCH) IP core 440C, . . . , central processing unit (CPU) IP core 404N (collectively referred to as 404). More or fewer IP cores 404 may be implemented in a particular environment.

The CEH 402 implements error reporting and error handling for functional safety. The CEH 402 detects and handles errors in its domain, or SoC, or Platform. Each IP core 404 registers the error in its functional safety error status register and sends sideband messages to the CEH 402. The CEH 402 may be implemented on a non-host processor (e.g., caretaker processor 208), The sideband message is generated whenever a functional safety register bit is set in the IP core 404. The functional safety register bit is used to indicate an error state. The functional safety error status register in conjunction with device (or IP) status register may classify errors as correctable, non-fatal, or fatal. An IP core 404 may configure error handling to enable or disable classes of errors using a device control register. Individual errors may be masked through a mask register in an IP core 404.

The CEH 402 uses configuration capabilities of each IP core 404 to selectively enable or disable error classes and errors based on the system operating mode and functional safety requirements. The CEH 402 configures errors for IP cores 404 and enables handling. On receipt of a sideband message, the CEH 402 decodes the source identifier (ID) of the message. The CEH 402 then reads the corresponding device status register of the matching source ID to decode the class of error. After decoding the class, the CEH 402 reads a corresponding error register of the IP core 404 for identifying the individual or multiple errors under such error class.

Based on the error class and identity of the error, the CEH 402 may run a diagnostic routine to take action on the error received. The diagnostic routine may attempt to clear the error through various ways as appropriate to the IP core 404 and its functionality within the system. For unaddressed errors, the CEH 402 logs and clears them for handling subsequent occurrence of the same/other error. The error log is also used by diagnostic routines for assessing system functional safety and required actions by the handler which may include notifying the user, recommend maintenance, and other defined actions.

The CEH 402 may be implemented in hardware, firmware, or software. The CEH 402 executes on a separate core from the general processing cores to ensure that it has the capability to operate in the case of system failure. The CEH 402 may be on-package or off-package from the general processing cores. The CEH 402 is configured to perform a diagnostic action in response to the type of error detected in an IP core 404. Diagnostic actions include, but are not limited to logging errors, reconfiguring an IP core 404, disabling an IP core 404, restarting an IP core 404, enabling another core as replacement or mitigation action, or the like.

Some or all of the IP cores 404 may report and handle errors up their own hardware/software stack (e.g., report to driver, kernel, or the like), along with reporting errors to the CEH 402. Alternatively, some or all of the IP cores 404 may only report to the CEH 402. The CEH 402 may propagate error reporting up through its own hardware/software stack, for example to report a recurring error to a user through a display device. This diversity of error reporting and handling may enable more aspects of functional safety.

Figure 5:
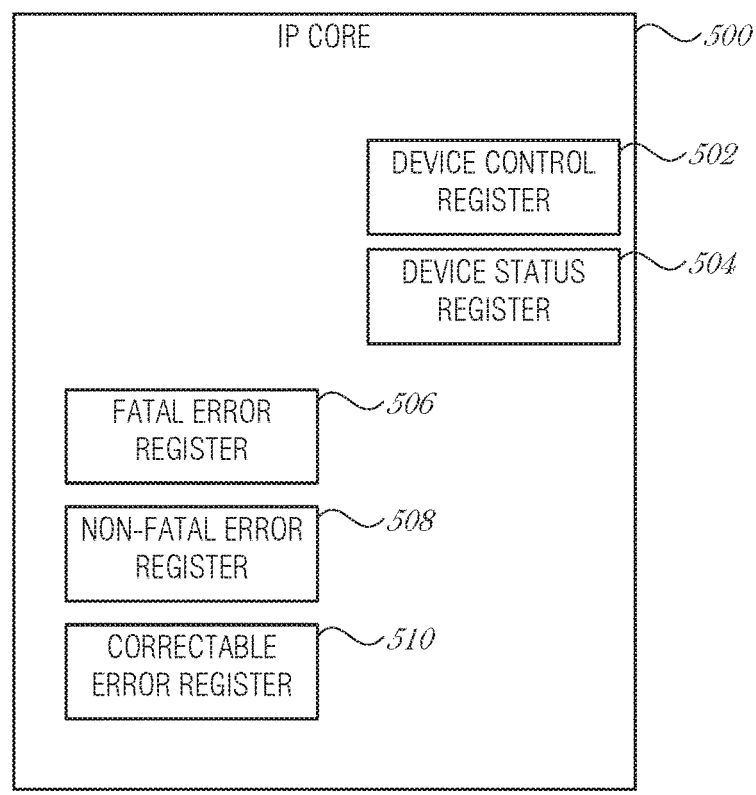
FIG. 5 is a block diagram illustrating an IP core, according to an embodiment.

FIG. 5 is a block diagram illustrating an IP core 500, according to an embodiment. The IP core 500 may be any of the IP cores 404A-N in FIG. 4, or another IP core. The IP core 500 includes a device control register 502 and a device status register 504. The device control register 502 includes at least three bits. In an embodiment, the device control register 502 uses bit position 0 to enabled/disable reporting of a correctable error, bit position 1 to enabled/disable reporting of a non-fatal error, and bit position 2 to enabled/disable reporting of a fatal error. A common error handler (e.g., CEH 402) may set the bits in the device control register 502 for each of the IP cores IP cores 404) that the CEH 402 is managing. As such, for example, the CEH 402 may enable reporting of non-fatal errors from one IP core 404A and disable such reporting from another IP core 404N.

The device status register 504 includes at least three bits. In an embodiment, the device status register 504 uses bit position 0 to report a correctable error, bit position 1 to report a non-fatal error, and bit position 2 to report a fatal error. If a bit in the device status register 504 is set to one, and if the device control register 502 indicates that the reporting for that type of error is enabled, the IP core 500 may report the error by sending a message to a common error handler (e.g., CEH 402).

In addition, the IP core 500 includes three error registers: fatal error register 506, non-fatal error register 508, and correctable error register 510. The error registers 506, 508, and 510 include one or more bits that provide encoded error information. For instance, the fatal error register 506 may include 8 bits, where bit position 0 is used to indicate a buffer undertow condition, bit position 1 is used to indicate a buffer overflow condition, bit position 2 is used to indicate a parity error, and the like. If any bit is set in the fatal error register 506, then the corresponding error class bit is set in the device status register 504. Depending on the configuration of the IP core 500, a message may be generated and sent to a common error handler, a device driver, a kernel, another hardware component, or the like.

Two or more of the device control register 502, device status register 504, fatal error register 506, non-fatal error register 508, and correctable error register 510 may be implemented in the same physical register (e.g., an existing general device register). For example, the device control register 502 may be offset from the zero position by some amount, such as by eight bit positions, and the device status register 504 may be offset by eleven positions, such that bit positions 0-7 may be used for general operations, bit positions 8-10 are used for the device control register 502 and bit positions 11-13 are used for the device status register 504, in a 32-bit general device register.

In another implementation, the device control register 502 and device status register 504 are compliant with the PCIe specification, and in particular with the PCI Express Capability Structure as defined in Section 5.8 of the PCI Express Base Specification, Revision 1.0, (Apr. 29, 2002). In the PCIe specification, the device control register 502 is at the 08 h byte offset and the device status register 504 is at the 0 Ah byte offset in the PCI Express Capability Structure. Other offsets may be used.

In some embodiments, the CEH 402 and IP cores 404 in its domain are PCIe compliant and may make use of the PCIe Advanced Error Reporting (AER) capabilities. As such, the device control register 502 and device status register 504 may be configured according to the PCIe specification.

The IP core 500 may include its own independent error detection logic. When an error is detected by the IP core 500, the appropriate bit flags are set in the device control register 502 and device status register 504.

Figure 6:
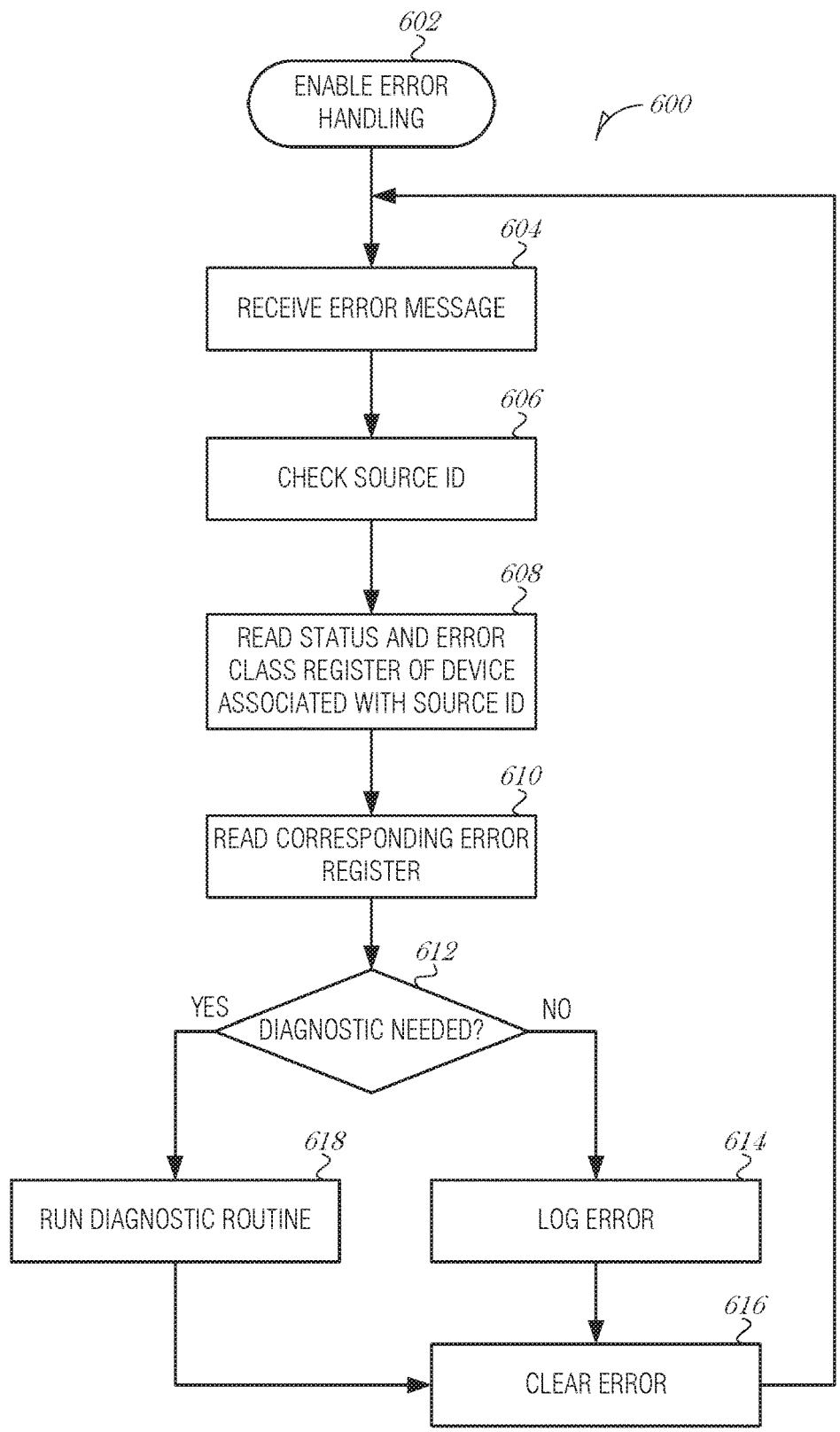
FIG. 6 is a flowchart illustrating an error handling process, according to an embodiment.

FIG. 6 is a flowchart illustrating an error handling process 600, according to an embodiment. At 602, the error handling is enabled. This may include activating a common error handler, for instance. An error message is received from an IP core that is managed by the common error handler (operation 604). The message may be in a standardized format, such as an interconnect fabric message format (e.g., IOSF messaging). The message may be transmitted over a sideband channel. The message may be sent to the common error handler by the IP core when a status bit indicates an error of some type (e.g., correctable, non-fatal, or fatal error type).

At operation 606, the common error handler checks the source ID of the message. The source ID may be included with the message. The source ID identifies the IP core that transmitted the message.

At operation 608, a device status register of the device corresponding to the source ID is read. The device status register includes a flag indicating the error class being reported. Error classes include, but are not limited to a correctable error, a non-fatal error, and a fatal error.

At operation 610, the corresponding error register is read. For instance, if a correctable error bit is set in the device status register, then a correctable error register may be read in order to obtain details about the correctable error.

At decision operation 612, the common error handler determines whether a diagnostic routine is needed to address the error being reported. For some errors that are handled by the IP core or are minor and do not affect operational safety, diagnostic routines are not needed. Consequently, the process 600 flows to operation 614, where the error is logged and the device status register and error registers are cleared (operation 616). Processing then repeats with error message monitoring.

If a diagnostic routine is needed, then the process 600 flows to operation 618, where a diagnostic routine is executed. The common error handler may perform a wide variety of actions in the process of executing the diagnostic routine. The common error handler is configured to respond to an error with a particular diagnostic routine. Examples include, but are not limited to, reconfiguring an IP core, reporting the error to a user, enlisting another IP core to attend to the functionality or error, disabling the erroring IP core, passing error handling control to a parallel or alternate software stack (e.g., sending messages up through a driver to an operating system), etc. The common error handler then resets the device status register and error registers in the IP core (operation 616) and the process 600 repeats from the error message monitoring.

In some implementations, the common error handler counts the number of times a particular diagnostic routine is executed. If the diagnostic routine is executed more than a threshold number of times in a period, then the common error handler may record the condition in the log (e.g., log error operation 614).

In summary, the common error handling described in FIGS. 1-6 and throughout this document may be used to identify an error in data, instruction, or functional operation of IP blocks, such as a graphics or display engine, an image processing unit, a platform controller hub, a central processing unit, or any other device or function on a platform or an SoC. The common handling of all functional safety errors may be in response to an occurrence of an error anywhere in the SoC or platform.

The common error handling may receive the error via a custom, specialized, sideband, or standard messages across custom or standard hardware processors, devices, or functions. The common error handling may identify source and class of an error, identify the error by accessing device/function error definitions, and determine whether the error requires a diagnostics operation as part of handling.

The common error handling may also determine whether the error persists after clearing the error, and determine whether the error requires logging. The error logging may use diagnostics routines for assessing system functional safety, handler actions for notifying the user, recommend maintenance, reset the device/function/IP block, mask the error, reconfigure the device/function/IP block with the same or alternate configuration settings, or other defined actions.

The common error handling described provides configuring the system or platform, where the individual device, function, or IP block is configured for its specific errors. Error may be classified as fatal, non-fatal or correctable. The class of error may be determined per device, function, or IP block locally, or as a part of common error handler for all, or for some locally and some by the common handler after the error message is received.

The common error handling may include distributed processing of operations including: checking source ID, reading error class, identifying the error, executing diagnostics, logging, or clearing the error. Distributing processing refers to the configuration where a common error handler is able to perform error handling in cooperation with or independent of hardware blocks. The common error handler determines the source of the error by decoding a source address from the received message. The common error handler may determine the class of error by decoding the received message, or by reading error class information from the source.

The configuring of the error per device/function/IP block corresponds to use of selectively enabling or disabling of available individual errors using a mask. This may include configuring of error reporting per device/function/IP block by selectively enabling or disabling of entire class of errors using a mask.

The common error handler may exist in parallel with other device, function, or IP block error handling mechanisms for diversity of error handling function. The device, function, or IP block error handling may be implemented with a specific kernel, driver, interrupt, hardware handler, or with other mechanisms.

The common error handler may execute and report errors independent of a central processor or central agent (e.g., host processor). The common error handler may optionally report errors to off-chip external agents that are independent of a host OS or drivers.

Once the error is reported, the corresponding device, function, hardware, or IP block may be prevented from entering a power management state until the error is cleared or diagnosed.

Error storage for the case of a virtualized platform is to reside in physical function 0.

The source may generate an error message and send to a non-host hardware processor per occurrence or based on an aggregate of occurrences (e.g., after 100 correctable errors).

Figure 7:
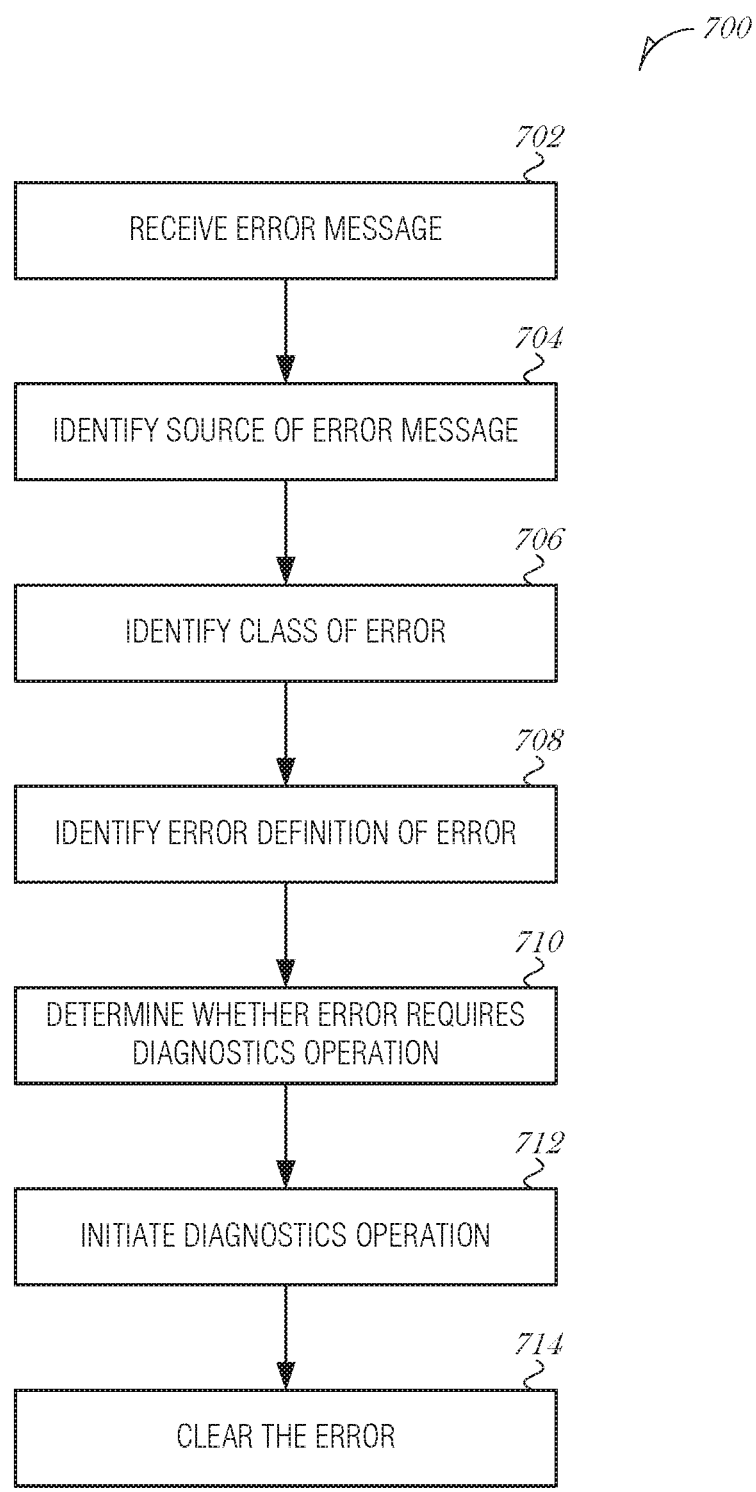
FIG. 7 is a flowchart illustrating a method of error handling, according to an embodiment.

FIG. 7 is a flowchart illustrating a method 700 of error handling, according to an embodiment. The method 700 is for error reporting and handling using a common error handler that handles errors for a plurality of hardware devices, the common error handler operable with other parallel error reporting and handling mechanisms. At 702, receiving, at the common error handler, an error message from a hardware device, the error message related to an error. Some of the error handling may be cooperatively handled between the hardware device and the common error handler. This provides diversity of error reporting and handling and may enable more aspects of functional safety. In an embodiment, the hardware device is configured to perform a portion of error handling internally. In an embodiment, the error is partially handled through distributed processing by the hardware device.

The common error handler and the hardware device may be on the same SoC, platform, or package, or may be in different SoCs, platforms, or packages. In an embodiment, the common error handler is incorporated into the same system on chip (SoC) as the hardware device. In a related embodiment, the common error handler is incorporated into the same die as the hardware device. In a related embodiment, the common error handler is incorporated into a different die as the hardware device, in a related embodiment, the common error handler is incorporated into the same platform as the hardware device. In a related embodiment, the common error handler is incorporated into a different platform as the hardware device.

The hardware device may be any device in SoC, package, or platform. In an embodiment, the hardware device is an intellectual property (IP) core. In a further embodiment, the IP core is a graphics engine. In a related embodiment, the IP core is a display engine. In a related embodiment, the IP core is an image processing unit. In a related embodiment, the IP core is a central processing unit. In a related embodiment, the IP core is a platform controller hub.

At 704, a source of the error message is identified. In an embodiment, identifying the source of the error message comprises parsing the error message and obtaining a source identifier from the error message, the source identifier uniquely associated with the hardware device.

At 706, a class of the error is identified. In embodiments, the class of the error is one of: a fatal error, a non-fatal error, or a correctable error. In an embodiment, identifying the class of the error comprises performing a lookup and identifying the class of the error from a local data store.

In an embodiment, identifying the class of the error comprises parsing the error message and obtaining the class of the error from the error message. In an embodiment, identifying the class of the error comprises reading a register in the hardware device and obtaining the class of the error from the register. In an embodiment, the register is a device status register.

At 708, an error definition of the error is identified. In an embodiment, identifying the error definition of the error comprises reading a register in the hardware device and determining the error definition based on contents of the register.

At 710, it is determined whether the error requires a diagnostics operation as part of the error handling.

At 712, the diagnostics operation is initiated when the error requires the diagnostics operation. In an embodiment, initiating the diagnostics operation when the error requires the diagnostics operation comprises reconfiguring the hardware device as part of the diagnostics operation. In a further embodiment, reconfiguring the hardware device comprises resetting the hardware device. In a related embodiment, reconfiguring the hardware device comprises reconfiguring the hardware device to mask further errors of the same class of the error.

In an embodiment, initiating the diagnostics operation when the error requires the diagnostics operation comprises transmitting a message up a device stack to handle the error in another portion of the system.

In an embodiment, initiating the diagnostics operation when the error requires the diagnostics operation comprises transmitting a message up a device stack to inform a user of the system of the error.

At 714, the error is cleared at the hardware device. In an embodiment, clearing the error at the hardware device comprises transmitting a clear signal to the hardware device to clear the error. In a further embodiment, the clear signal is implemented by writing a binary one to a portion of the register at the hardware device.

In an embodiment, the method 700 includes determining whether to log the error and logging the error based on the determination of whether to log the error.

In an embodiment, the common error handler is not a host processor. By having the common error handler on its own microcontroller or microprocessor, the common error handler is able to detect and handle errors that may occur on the host processor.

In an embodiment, the common error handler concurrently exists with another error detection, reporting, and handling mechanism as a diversity of function for operational safety. The other error detection, reporting, and handling mechanisms may be implemented in the hardware blocks. In a further embodiment, the other error detection, reporting, and handling mechanism is per device, domain, or interrupt service routine, and associated driver, kernel, or operating system.

In an embodiment, the common error handler handles the errors for all of functional safety critical hardware devices on the same system on chip (SoC) as the common error handler.

In an embodiment, the common error handler handles the errors for all of functional safety critical hardware devices on the same platform as the common error handler.

In an embodiment, the common error handler is to use physical function 0 for error storage and reporting. This is for virtualized systems.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
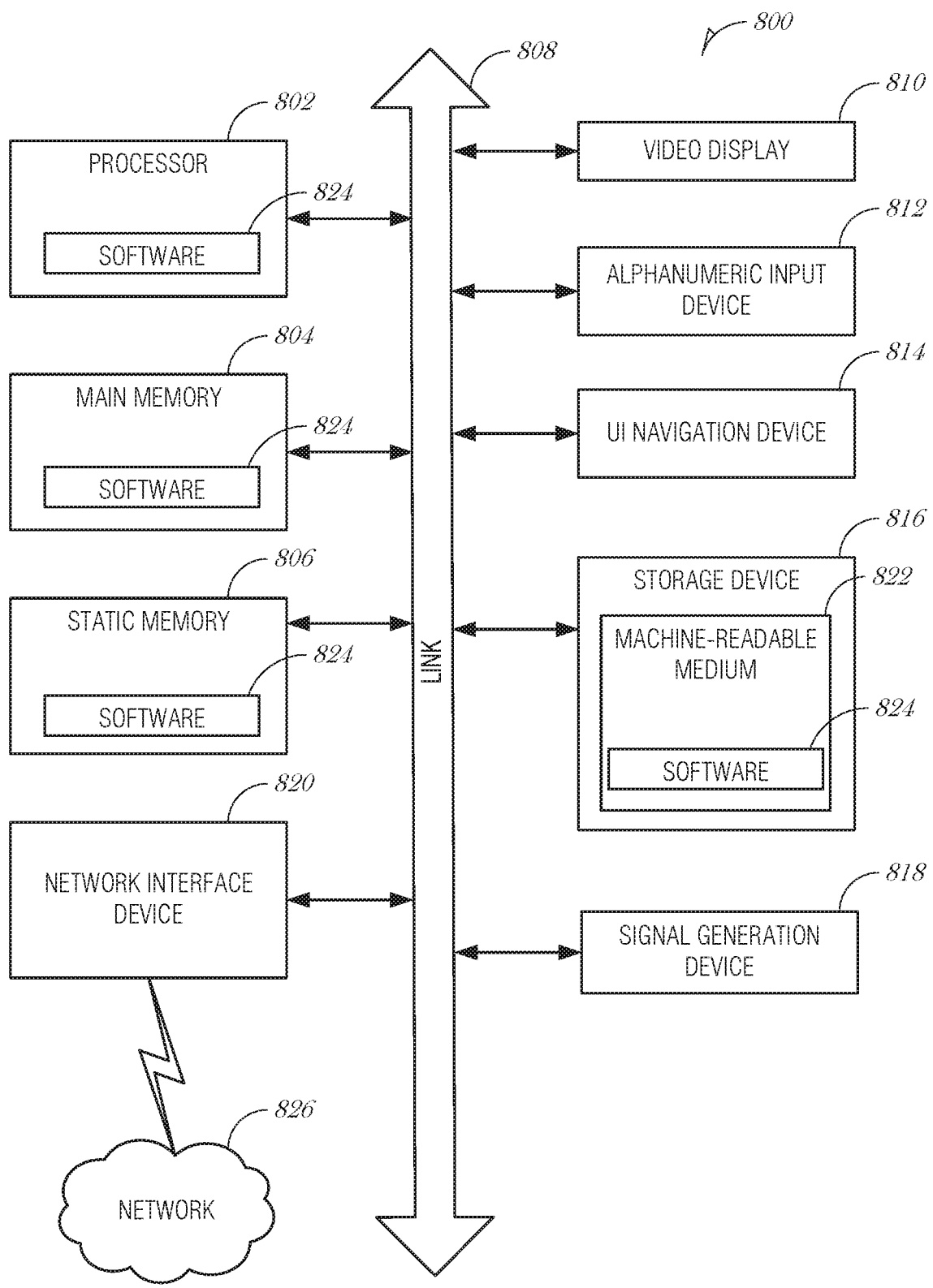
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (UPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for error reporting and handling, the system including a common error handler that handles errors for a plurality of hardware devices, the common error handler operable with other parallel error reporting and handling mechanisms, the system comprising: a processor subsystem; and a memory coupled to the processor subsystem, the memory including instructions, which when executed by the processor subsystem, cause the processor subsystem to: receive an error message from a hardware device, the error message related to an error; identify a source of the error message; identify a class of the error; identify an error definition of the error; determine whether the error requires a diagnostics operation as part of the error handling; initiate the diagnostics operation when the error requires the diagnostics operation; and clear the error at the hardware device.

In Example 2, the subject matter of Example 1 includes, wherein the error is partially handled through distributed processing by the hardware device.

In Example 3, the subject matter of Examples 1-2 includes, wherein the processor subsystem is incorporated into the same system on chip (SoC) as the hardware device.

In Example 4, the subject matter of Examples 1-3 includes, wherein the processor subsystem is incorporated into the same die as the hardware device.

In Example 5, the subject matter of Examples 1-4 includes, wherein the processor subsystem is incorporated into a different die as the hardware device.

In Example 6, the subject matter of Examples 1-5 includes, wherein the processor subsystem is incorporated into the same platform as the hardware device.

In Example 7, the subject matter of Examples 1-6 includes, wherein the processor subsystem is incorporated into a different platform as the hardware device.

In Example 8, the subject matter of Examples 1-7 includes, wherein the hardware device is an intellectual property (IP) core.

In Example 9, the subject matter of Example 8 includes, wherein the IP core is a graphics engine.

In Example 10, the subject matter of Examples 8-9 includes, wherein the IP core is a display engine.

In Example 11, the subject matter Examples 8-10 includes, wherein the IP core is an image processing unit.

In Example 12, the subject matter of Examples 8-11 includes, wherein the IP core is a central processing unit.

In Example 13, the subject matter of Examples 8-12 includes, wherein the IP core is a platform controller hub.

In Example 14, the subject matter of Examples 1-13 includes, wherein the hardware device is configured to perform a portion of error handling internally.

In Example 15, the subject matter of Examples 1-14 includes, wherein the class of the error is one of: a fatal error, a non-fatal error, or a correctable error.

In Example 16, the subject matter of Examples 1-1.5 includes, wherein to identify the source of the error message, the processor subsystem is to: parse the error message; and obtain a source identifier from the error message, the source identifier uniquely associated with the hardware device.

In Example 17, the subject matter of Examples 1-16 includes, wherein to identify the class of the error, the processor subsystem is to: parse the error message and obtain the class of the error from the error message.

In Example 18, the subject matter of Examples 1-17 includes, wherein to identify the class of the error, the processor subsystem is to: read a register in the hardware device; and obtain the class of the error from the register.

In Example 19, the subject matter of Examples 1-18 includes, wherein to identify the class of the error, the processor subsystem is to: perform a lookup and identify the class of the error from a local data store.

In Example 20, the subject matter of Examples 18-19 includes, wherein the class of the error is one of: a fatal error, a non-fatal error, or a correctable error.

In Example, 21, the subject matter of Examples 18-20 includes, wherein the register is a device status register.

In Example 22, the subject matter of Examples 1-21 includes, wherein to identify the error definition of the error, the processor subsystem is to: read a register in the hardware device; and determine the error definition based on contents of the register.

In Example 23, the subject matter of Examples 1-22 includes, wherein to initiate the diagnostics operation when the error requires the diagnostics operation, the processor subsystem is to: reconfigure the hardware device as part of the diagnostics operation.

In Example 24, the subject matter of Example 23 includes, wherein to reconfigure the hardware device, the processor subsystem is to: reset the hardware device.

In Example 25, the subject matter of Examples 23-24 includes, wherein to reconfigure the hardware device, the processor subsystem is to: reconfigure the hardware device to mask further errors of the same class of the error.

In Example 26, the subject matter of Examples 1-25 includes, wherein to initiate the diagnostics operation when the error requires the diagnostics operation, the processor subsystem is to: transmit a message up a device stack to handle the error in another portion of the system.

In Example 27, the subject matter of Examples 1-26 includes, wherein to initiate the diagnostics operation when the error requires the diagnostics operation, the processor subsystem is to: transmit a message up a device stack to inform a user of the system of the error.

In Example 28, the subject matter of Examples 1-27 includes, wherein to clear the error at the hardware device, the processor subsystem is to transmit a clear signal to the hardware device to clear the error.

In Example 29, the subject matter of Example 28 includes, wherein the clear signal is implemented by writing a binary one to a portion of the register at the hardware device.

In Example 30, the subject matter of Examples 1-29 includes, wherein the processor subsystem is further to: determine whether to log the error; and log the error based on the determination of whether to log the error.

In Example 31, the subject matter of Examples 1-30 includes, wherein the processor subsystem handling the errors is not a host processor.

In Example 32, the subject matter of Examples 1-31 includes, wherein the processor subsystem handling the errors concurrently exists with another error detection, reporting, and handling mechanism as a diversity of function for operational safety.

In Example 33, the subject matter of Example 32 includes, wherein another error detection, reporting, and handling mechanism is per device, domain, or interrupt service routine, and associated driver, kernel, or operating system.

In Example 34, the subject matter of Examples 1-33 includes, wherein the processor subsystem handles the errors for all of functional safety critical hardware devices on the same system on chip (SoC) as the processor subsystem.

In Example 35, the subject matter of Examples 1-34 includes, wherein the processor subsystem handles the errors for all of functional safety critical hardware devices on the same platform as the processor subsystem.

In Example 36, the subject matter of Examples 1-35 includes, for error storage and reporting.

Example 37 is a method for error reporting and handling using a common error handler that handles errors for a plurality of hardware devices, the common error handler operable with other parallel error reporting and handling mechanisms, the method comprising: receiving, at the common error handler, an error message from a hardware device, the error message related to an error; identifying a source of the error message; identifying a class of the error; identifying an error definition of the error; determining whether the error requires a diagnostics operation as part of the error handling; initiating the diagnostics operation when the error requires the diagnostics operation; and clearing the error at the hardware device.

In Example 38, the subject matter of Example 37 includes, wherein the error is partially handled through distributed processing by the hardware device.

In Example 39, the subject matter of Examples 37-38 includes, wherein the common error handler is incorporated into the same system on chip (SoC) as the hardware device.

In Example 40, the subject matter of Examples 37-39 includes, wherein the common error handler is incorporated into the same die as the hardware device.

In Example 41, the subject matter of Examples 37-40 includes, wherein the common error handler is incorporated into a different die as the hardware device.

In Example 42, the subject matter of Examples 37-41 includes, wherein the common error handler is incorporated into the same platform as the hardware device.

In Example 43, the subject matter of Examples 37-42 includes, wherein the common error handler is incorporated into a different platform as the hardware device.

In Example 44, the subject matter of Examples 37-43 includes, wherein the hardware device is an intellectual property GP) core.

In Example 45, the subject matter of Example 44 includes, wherein the IP core is a graphics engine.

In Example 46, the subject matter of Examples 44-45 includes, wherein the IP core is a display engine.

In Example 47, the subject matter of Examples 44-46 includes, wherein the IP core is an image processing unit.

In Example 48, the subject matter of Examples 44-47 includes, wherein the IP core is a central processing unit.

In Example 49, the subject matter of Examples 44-48 includes, wherein the IP core is a platform controller hub.

In Example 50, the subject matter of Examples 37-49 includes, wherein the hardware device is configured to perform a portion of error handling internally.

In Example 51, the subject matter of Examples 37-50 includes, wherein the class of the error is one of: a fatal error, a non-fatal error, or a correctable error.

In Example 52, the subject matter of Examples 37-51 includes, wherein identifying the source of the error message comprises: parsing the error message; and obtaining a source identifier from the error message, the source identifier uniquely associated with the hardware device.

In Example 53, the subject matter of Examples 37-52 includes, wherein identifying the class of the error comprises: parsing the error message and obtaining the class of the error from the error message.

In Example 54, the subject matter of Examples 37-53 includes, wherein identifying the class of the error comprises: reading a register in the hardware device; and obtaining the class of the error from the register.

In Example 55, the subject matter of Examples 37-54 includes, wherein identifying the class of the error comprises: performing a lookup and identify the class of the error from a local data store.

In Example 56, the subject matter of Examples 54-55 includes, wherein the class of the error is one of: a fatal error, a non-fatal error, or a correctable error.

In Example 57, the subject matter of Examples 54-56 includes, wherein the register is a device status register.

In Example 58, the subject matter of Examples 37-57 includes, wherein identifying the error definition of the error comprises: reading a register in the hardware device; and determining the error definition based on contents of the register.

In Example 59, the subject matter of Examples 37-58 includes, wherein initiating the diagnostics operation when the error requires the diagnostics operation comprises: reconfiguring the hardware device as part of the diagnostics operation.

In Example 60, the subject matter of Example 59 includes, wherein reconfiguring the hardware device comprises: resetting the hardware device.

In Example 61, the subject matter of Examples 59-60 includes, wherein reconfiguring the hardware device comprises: reconfiguring the hardware device to mask further errors of the same class of the error.

In Example 62, the subject matter of Examples 37-61 includes, wherein initiating the diagnostics operation when the error requires the diagnostics operation comprises: transmitting a message up a device stack to handle the error in another portion of the system.

In Example 63, the subject matter of Examples 37-62 includes, wherein initiating the diagnostics operation when the error requires the diagnostics operation comprises: transmitting a message up a device stack to inform a user of the system of the error.

In Example 64, the subject matter of Examples 37-63 includes, wherein clearing the error at the hardware device comprises: transmitting a clear signal to the hardware device to clear the error.

In Example 65, the subject matter of Example 64 includes, wherein the clear signal is implemented by writing a binary one to a portion of the register at the hardware device.

In Example 66, the subject matter of Examples 37-65 includes, determining whether to log the error; and logging the error based on the determination of whether to log the error.

In Example 67, the subject matter of Examples 37-66 includes, wherein the common error handler is not a host processor.

In Example 68, the subject matter of Examples 37-67 includes, wherein the common error handler concurrently exists with another error detection, reporting, and handling mechanism as a diversity of function for operational safety.

In Example 69, the subject matter of Example 68 includes, wherein the another error detection, reporting, and handling mechanism is per device, domain, or interrupt service routine, and associated driver, kernel, or operating system.

In Example 70, the subject matter of Examples 37-69 includes, wherein the common error handler handles the errors for all of functional safety critical hardware devices on the same system on chip (SoC) as the common error handler.

In Example 71, the subject matter of Examples 37-70 includes, wherein the common error handler handles the errors for all of functional safety critical hardware devices on the same platform as the common error handler.

In Example 72, the subject matter of Examples 37-71 includes, for error storage and reporting.

Example 73 is at least one machine-readable medium including instructions, which when executed by a machine, cause the machine to perform operations of any of the methods of Examples 37-72.

Example 74 is an apparatus comprising means for performing any of the methods of Examples 37-72.

Example 75 is an apparatus for error reporting and handling using a common error handler that handles errors for a plurality of hardware devices, the common error handler operable with other parallel error reporting and handling mechanisms, the apparatus comprising: means for receiving, at the common error handler, an error message from a hardware device, the error message related to an error; means for identifying a source of the error message; means for identifying a class of the error; means for identifying an error definition of the error; means for determining whether the error requires a diagnostics operation as part of the error handling; means for initiating the diagnostics operation when the error requires the diagnostics operation; and means for clearing the error at the hardware device.

In Example 76, the subject matter of Example 75 includes, wherein the error is partially handled through distributed processing by the hardware device.

In Example 77, the subject matter of Examples 75-76 includes, wherein the common error handler is incorporated into the same system on chip (SoC) as the hardware device.

In Example 78, the subject matter of Examples 75-77 includes, wherein the common error handler is incorporated into the same die as the hardware device.

In Example 79, the subject matter of Examples 75-78 includes, wherein the common error handler is incorporated into a different die as the hardware device.

In Example 80, the subject matter of Examples 75-79 includes, wherein the common error handler is incorporated into the same platform as the hardware device.

In Example 81, the subject matter of Examples 75-80 includes, wherein the common error handler is incorporated into a different platform as the hardware device.

In Example 82, the subject matter of Examples 75-81 includes, wherein the hardware device is an intellectual property (IP) core.

In Example 83, the subject matter of Example 82 includes, wherein the IP core is a graphics engine.

In Example 84, the subject matter of Examples 82-83 includes, wherein the IP core is a display engine.

In Example 85, the subject matter of Examples 82-84 includes, wherein the IP core is an image processing unit.

In Example 86, the subject matter of Examples 82-85 includes, wherein the IP core is a central processing unit.

In Example 87, the subject matter of Examples 82-86 includes, wherein the IP core is a platform controller hub.

In Example 88, the subject matter of Examples 75-87 includes, wherein the hardware device is configured to perform a portion of error handling internally.

In Example 89, the subject matter of Examples 75-88 includes, wherein the class of the error is one of: a fatal error, a non-fatal error, or a correctable error.

In Example 90, the subject matter of Examples 75-89 includes, wherein the means for identifying the source of the error message comprise: means for parsing the error message; and means for obtaining a source identifier from the error message, the source identifier uniquely associated with the hardware device.

In Example 91, the subject matter of Examples 75-90 includes, wherein the means for identifying the class of the error comprise: means for parsing the error message and obtaining the class of the error from the error message.

In Example 92, the subject matter of Examples 75-91 includes, wherein the means for identifying the class of the error comprise: means for reading a register in the hardware device; and means for obtaining the class of the error from the register.

In Example 93, the subject matter of Examples 75-92 includes, wherein the means for identifying the class of the error comprise: means for performing a lookup and identify the class of the error from a local data store.

In Example 94, the subject matter of Examples 92-93 includes, wherein the class of the error is one of: a fatal error, a non-fatal error, or a correctable error.

In Example 95, the subject matter of Examples 92-94 includes, wherein the register is a device status register.

In Example 96, the subject matter of Examples 75-95 includes, wherein the means for identifying the error definition of the error comprise: means for reading a register in the hardware device; and means for determining the error definition based on contents of the register.

In Example 97, the subject matter of Examples 75-96 includes, wherein the means for initiating the diagnostics operation when the error requires the diagnostics operation comprise: means for reconfiguring the hardware device as part of the diagnostics operation.

In Example 98, the subject matter of Example 97 includes, wherein the means for reconfiguring the hardware device comprise: means for resetting the hardware device.

In Example 99, the subject matter of Examples 97-98 includes, wherein the means for reconfiguring the hardware device comprise: means for reconfiguring the hardware device to mask further errors of the same class of the error.

In Example 100, the subject matter of Examples 75-99 includes, wherein the means for initiating the diagnostics operation when the error requires the diagnostics operation comprise: means for transmitting a message up a device stack to handle the error in another portion of the system.

In Example 101, the subject matter of Examples 75-100 includes, wherein the means for initiating the diagnostics operation when the error requires the diagnostics operation comprise: means for transmitting a message up a device stack to inform a user of the system of the error.

In Example 102, the subject matter of Examples 75-101 includes, wherein the means for clearing the error at the hardware device comprise: means for transmitting a clear signal to the hardware device to clear the error.

In Example 103, the subject matter of Example 102 includes, wherein the clear signal is implemented by writing a binary one to a portion of the register at the hardware device.

In Example 104, the subject matter of Examples 75-103 includes, means for determining whether to log the error; and means for logging the error based on the determination of whether to log the error.

In Example 105, the subject matter of Examples 75-104 includes, wherein the common error handler is not a host processor.

In Example 106, the subject matter of Examples 75-105 includes, wherein the common error handler concurrently exists with another error detection, reporting, and handling mechanism as a diversity of function for operational safety.

In Example 107, the subject matter of Example 106 includes, wherein the another error detection, reporting, and handling mechanism is per device, domain, or interrupt service routine, and associated driver, kernel, or operating system.

In Example 108, the subject matter of Examples 75-107 includes, wherein the common error handler handles the errors for all of functional safety critical hardware devices on the same system on chip (SoC) as the common error handler.

In Example 109, the subject matter f Examples 75-108 includes, wherein the common error handler handles the errors for all of functional safety critical hardware devices on the same platform as the common error handler.

In Example 110, the subject matter of Examples 75-109 includes, for error storage and reporting.

Example 111 is at least one machine-readable medium including instructions for error reporting and handling using a common error handler that handles errors for a plurality of hardware devices, the common error handler operable with other parallel error reporting and handling mechanisms, the instructions when executed by a machine, cause the machine to perform the operations comprising: receiving, at the common error handler, an error message from a hardware device, the error message related to an error; identifying a source of the error message; identifying a class of the error; identifying an error definition of the error; determining whether the error requires a diagnostics operation as part of the error handling; initiating the diagnostics operation when the error requires the diagnostics operation; and clearing the error at the hardware device.

In Example 112, the subject matter of Example 111 includes, wherein the error is partially handled through distributed processing by the hardware device.

In Example 113, the subject matter of Examples 111-112 includes, wherein the common error handler is incorporated into the same system on chip (SoC) as the hardware device.

In Example 114, the subject matter of Examples 111-113 includes, wherein the common error handler is incorporated into the same die as the hardware device.

In Example 115, the subject matter of Examples 111-114 includes, wherein the common error handler is incorporated into a different die as the hardware device.

In Example 116, the subject matter of Examples 111-115 includes, wherein the common error handler is incorporated into the same platform as the hardware device.

In Example 117, the subject matter of Examples 111-116 includes, wherein the common error handler is incorporated into a different platform as the hardware device.

In Example 118, the subject matter of Examples 111-117 includes, wherein the hardware device is an intellectual property (IP) core.

In Example 119, the subject matter of Example 118 includes, wherein the IP core is a graphics engine.

In Example 120, the subject matter of Examples 118-119 includes, wherein the IP core is a display engine.

In Example 121, the subject matter of Examples 118-120 includes, wherein the IP core is an image processing unit.

In Example 122, the subject matter of Examples 118-121 includes, wherein the IP core is a central processing unit.

In Example 123, the subject matter of Examples 118-122 includes, wherein the IP core is a platform controller hub.

In Example 124, the subject matter of Examples 111-423 includes, wherein the hardware device is configured to perform a portion of error handling internally.

In Example 125, the subject matter of Examples 111-124 includes, wherein the class of the error is one of: a fatal error, a non-fatal error, or a correctable error.

In Example 126, the subject matter of Examples 111-125 includes, wherein the instructions for identifying the source of the error message comprise instructions for: parsing the error message; and obtaining a source identifier from the error message, the source identifier uniquely associated with the hardware device.

In Example 127, the subject matter of Examples 111-126 includes, wherein the instructions for identifying the class of the error comprise instructions for: parsing the error message and obtaining the class of the error from the error message.

In Example 128, the subject matter of Examples 111-127 includes, wherein the instructions for identifying the class of the error comprise instructions for: reading a register in the hardware device; and obtaining the class of the error from the register.

In Example 129, the subject matter of Examples 111-128 includes, wherein the instructions for identifying the class of the error comprise instructions for: performing a lookup and identify the class of the error from a local data store.

In Example 130, the subject matter of Examples 128-129 includes, wherein the class of the error is one of: a fatal error, a non-fatal error, or a correctable error.

In Example 131, the subject matter of Examples 128-130 includes, wherein the register is a device status register.

In Example 132, the subject matter of Examples 111-131 includes, wherein the instructions for identifying the error definition of the error comprise instructions for: reading a register in the hardware device; and determining the error definition based on contents of the register.

In Example 133, the subject matter of Examples 111-132 includes, wherein the instructions for initiating the diagnostics operation when the error requires the diagnostics operation comprise instructions for: reconfiguring the hardware device as part of the diagnostics operation.

In Example 134, the subject matter of Example 133 includes, wherein the instructions for reconfiguring the hardware device comprise instructions for: resetting the hardware device.

In Example 135, the subject matter of Examples 133-134 includes, wherein the instructions for reconfiguring the hardware device comprise instructions for: reconfiguring the hardware device to mask further errors of the same class of the error.

In Example 136, the subject matter of Examples 111-135 includes, wherein the instructions for initiating the diagnostics operation when the error requires the diagnostics operation comprise instructions for: transmitting a message up a device stack to handle the error in another portion of the system.

In Example 137, the subject matter of Examples 111-136 includes, wherein the instructions for initiating the diagnostics operation when the error requires the diagnostics operation comprise instructions for transmitting a message up a device stack to inform a user of the system of the error.

In Example 138, the subject matter of Examples 111-137 includes, wherein the instructions for clearing the error at the hardware device comprise instructions for: transmitting a clear signal to the hardware device to clear the error.

In Example 139, the subject matter of Example 138 includes, wherein the clear signal is implemented by writing a binary one to a portion of the register at the hardware device.

In Example 140, the subject matter of Examples 111-139 includes, instructions for: determining whether to log the error; and logging the error based on the determination of whether to log the error.

In Example 141, the subject matter of Examples 111-141 includes, wherein the common error handler is not a host processor.

In Example 142, the subject matter of Examples 111-141 includes, wherein the common error handler concurrently exists with another error detection, reporting, and handling mechanism as a diversity of function for operational safety.

In Example 143, the subject matter of Example 142 includes, wherein the another error detection, reporting, and handling mechanism is per device, domain, or interrupt service routine, and associated driver, kernel, or operating system.

In Example 144, the subject matter of Examples 111-143 includes, wherein the common error handler handles the errors for all of functional safety critical hardware devices on the same system on chip (SoC) as the common error handler.

In Example 145, the subject matter of Examples 111-144 includes, wherein the common error handler handles the errors for all of functional safety critical hardware devices on the same platform as the common error handler.

In Example 146, the subject matter of Examples 111-145 includes, for error storage and reporting.

Example 147 is at least one machine-readable medium including instructions, which when executed by a machine, cause the machine to perform operations of any of the operations of Examples 1-146.

Example 148 is an apparatus comprising means for performing any of the operations of Examples 1-146.

Example 149 is a system to perform the operations of any of the Examples 1-146.

Example 150 is a method to perform the operations of any of the Examples 1-146.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed. Description, with a claim standing on its own as a separate embodiment. The scope of the embodiments disclosed herein is to be determined with reference to the appended claims, along with the full scope of equivalents to which such claims are entitled.

What is claimed is:

1. A system for error reporting and handling, the system including a common error handler that handles errors for a plurality of functional safety critical hardware devices in a system on chip (SoC) platform, the common error handler operable with other parallel error reporting and handling mechanisms, the system comprising:
   a processor subsystem; and
   a memory coupled to the processor subsystem, the memory including instructions, which when executed by the processor subsystem, cause the processor subsystem to:
      receive an error message from a hardware device, the error message related to an error, and wherein the hardware device is an intellectual property (IP) core;
      identify a source of the error message from the error message;
      identify a class of the error by reading a functional safety device status register in the hardware device;
      identify an error definition of the error by reading a functional safety error status register in the hardware device;
      determine whether the error requires a diagnostics operation as part of the error handling;
      initiate the diagnostics operation when the error requires the diagnostics operation; and
      clear the error at the hardware device by writing to the functional safety device status register and the functional safety error status register;
      wherein the processor subsystem handles the errors for all functional safety critical hardware devices on the SoC platform.

2. The system of claim 1, wherein the hardware device is configured to perform a portion of error handling internally.

3. The system of claim 1, wherein the class of the error is one of: a fatal error, a non-fatal error, or a correctable error.

4. The system of claim 1, wherein to identify the source of the error message, the processor subsystem is to:
   parse the error message; and
   obtain a source identifier from the error message, the source identifier uniquely associated with the hardware device.

5. The system of claim 1, wherein to identify the class of the error, the processor subsystem is to:
   parse the error message and obtain the class of the error from the error message.

6. The system of claim 1, wherein to identify the class of the error, the processor subsystem is to:
   perform a lookup and identify the class of the error from a local data store.

7. The system of claim 1, wherein to initiate the diagnostics operation when the error requires the diagnostics operation, the processor subsystem is to:
   reconfigure the hardware device as part of the diagnostics operation.

8. The system of claim 7, wherein to reconfigure the hardware device, the processor subsystem is to:
   reconfigure the hardware device to mask further errors of the same class of the error.

9. The system of claim 1, wherein to initiate the diagnostics operation when the error requires the diagnostics operation, the processor subsystem is to:
   transmit a message up a device stack to handle the error.

10. The system of claim 1, wherein to initiate the diagnostics operation when the error requires the diagnostics operation, the processor subsystem is to:
    transmit a message up a device stack to inform a user of the system of the error.

11. The system of claim 1, wherein to clear the error at the hardware device, the processor subsystem is to transmit a clear signal to the hardware device to clear the error.

12. A method for error reporting and handling using a common error handler that handles errors for a plurality of functional safety critical hardware devices in a system on chip (SoC) platform, the common error handler operable with other parallel error reporting and handling mechanisms, the method comprising:
    receiving, at the common error handler, an error message from a hardware device, the error message related to an error, and wherein the hardware device is an intellectual property (IP) core;
    identifying a source of the error message by reading a functional safety error status register in the hardware device;
    identifying a class of the error by reading a functional safety device status register in the hardware device;
    identifying an error definition of the error;
    determining whether the error requires a diagnostics operation as part of the error handling;
    initiating the diagnostics operation when the error requires the diagnostics operation; and
    clearing the error at the hardware device by writing to the functional safety device status register and the functional safety error status register;
    wherein the processor subsystem handles the errors for all functional safety critical hardware devices on the SoC platform.

13. The method of claim 12, wherein the error is partially handled through distributed processing by the hardware device.

14. The method of claim 12, wherein the common error handler is incorporated into the same system on chip (SoC) as the hardware device.

15. The method of claim 12, wherein initiating the diagnostics operation when the error requires the diagnostics operation comprises:
    transmitting a message up a device stack to inform a user of the system of the error.

16. The method of claim 12, wherein clearing the error at the hardware device comprises:
    transmitting a clear signal to the hardware device to clear the error.

17. The method of claim 16, wherein the clear signal is implemented by writing a binary one to a portion of a register at the hardware device.

18. At least one non-transitory machine-readable medium including instructions for error reporting and handling using a common error handler that handles errors for a plurality of functional safety critical hardware devices in a system on chip (SoC) platform, the common error handler operable with other parallel error reporting and handling mechanisms, the instructions when executed by a machine, cause the machine to perform the operations comprising:
    receiving, at the common error handler, an error message from a hardware device, the error message related to an error, and wherein the hardware device is an intellectual property (IP) core;
    identifying a source of the error message;
    identifying a class of the error by reading a functional safety device status register in the hardware device;

identifying an error definition of the error by reading a functional safety error status register in the hardware device;

determining whether the error requires a diagnostics operation as part of the error handling;

initiating the diagnostics operation when the error requires the diagnostics operation; and clearing the error at the hardware device by writing to the functional safety device status register and the functional safety error status register;

wherein the processor subsystem handles the errors for all functional safety critical hardware devices on the SoC platform.

19. The non-transitory machine-readable medium of claim 18, wherein the instructions for clearing the error at the hardware device comprise instructions for:

transmitting a clear signal to the hardware device to clear the error.

20. The non-transitory machine-readable medium of claim 19, wherein the clear signal is implemented by writing a binary one to a portion of a register at the hardware device.

21. The non-transitory machine-readable medium of claim 18, further comprising instructions for:

determining whether to log the error; and logging the error based on the determination of whether to log the error.

22. The non-transitory machine-readable medium of claim 18, wherein the common error handler is not a host processor.

* * * * *